(12) United States Patent
Baert et al.

(10) Patent No.: US 11,097,512 B1
(45) Date of Patent: Aug. 24, 2021

(54) FLOOR PANEL AND METHOD OF MANUFACTURING A FLOOR PANEL

(71) Applicant: Champion Link International Corporation, The Valley (AI)

(72) Inventors: Thomas Luc Martine Baert, Sint-Martens-Latem (BE); Tom Van Poyer, Jiaxing Zhejiang (CN); Sven Boon, Jiaxing Zhejiang (CN)

(73) Assignee: CHAMPION LINK INTERN AITON AL CORPORATION, The Valley (AI)

( * ) Notice: Subject to any disclaimer, the term of this patent is extended or adjusted under 35 U.S.C. 154(b) by 0 days.

(21) Appl. No.: 16/778,153

(22) Filed: Jan. 31, 2020

(51) Int. Cl.
| | |
|---|---|
| *E04B 2/00* | (2006.01) |
| *B32B 13/12* | (2006.01) |
| *E04F 13/08* | (2006.01) |
| *E04F 15/10* | (2006.01) |
| *B32B 3/06* | (2006.01) |
| *B32B 13/02* | (2006.01) |
| *E04F 15/02* | (2006.01) |

(52) U.S. Cl.
CPC ............... *B32B 13/12* (2013.01); *B32B 3/06* (2013.01); *B32B 13/02* (2013.01); *E04F 13/0866* (2013.01); *E04F 15/107* (2013.01); *B32B 2262/101* (2013.01); *B32B 2471/00* (2013.01); *B32B 2607/00* (2013.01); *E04F 13/0894* (2013.01); *E04F 15/02038* (2013.01)

(58) Field of Classification Search
CPC ..... E04F 15/02038; E04F 15/12; E04F 15/02; E04F 2201/023; Y10T 428/167; F16B 5/0012; B29B 17/0042; B29B 17/00; B29B 17/02

USPC ............... 52/588.1, 592.1, 591.1; 156/307.4; 428/159, 171
See application file for complete search history.

(56) References Cited

U.S. PATENT DOCUMENTS

| | | | |
|---|---|---|---|
| 2,944,291 A | 10/1957 | Prior et al. | |
| 3,421,597 A | 1/1969 | Blau | |
| 3,931,428 A | 1/1976 | Reick | |
| 4,278,728 A | 7/1981 | Honda | |
| 5,336,551 A | 8/1994 | Graiver | |
| 5,631,053 A | 5/1997 | Andersen | |
| 5,776,580 A * | 7/1998 | Rasmussen | E04B 1/80 428/74 |

(Continued)

FOREIGN PATENT DOCUMENTS

| | | |
|---|---|---|
| CN | 100419019 | 2/2007 |
| CN | 101386516 | 3/2009 |

(Continued)

OTHER PUBLICATIONS

International Search Report and Written Opinion of corresponding Application No. NL 2025119 dated Jan. 14, 2021.

(Continued)

*Primary Examiner* — Chi Q Nguyen
(74) *Attorney, Agent, or Firm* — Emerson, Thomson & Bennett, LLC; Roger D. Emerson

(57) ABSTRACT

Provided is a panel for constructing a floor or wall covering. The panel includes a core which includes a mineral material and at least one dendritic additive for improving the flexibility and tensile strength of the panel. The panel further includes at least one pair of opposite side edges. The pair of opposite side edges are provided with interconnecting coupling means for interconnecting adjacent panels.

14 Claims, 1 Drawing Sheet

(56) References Cited

U.S. PATENT DOCUMENTS

| | | | |
|---|---|---|---|
| 6,688,061 | B2 | 2/2004 | Garcia |
| 6,761,794 | B2 * | 7/2004 | Mott .................. B29B 17/0042 |
| | | | 156/277 |
| 6,933,043 | B1 | 8/2005 | Son |
| 7,255,907 | B2 | 8/2007 | Feigin et al. |
| 7,399,510 | B2 * | 7/2008 | Dupouy .................. B32B 15/04 |
| | | | 428/55 |
| 7,918,062 | B2 | 4/2011 | Chen |
| 8,287,991 | B2 * | 10/2012 | Donelson ................ B32B 27/36 |
| | | | 428/200 |
| 8,419,877 | B2 | 4/2013 | Pervan |
| 10,328,680 | B2 * | 6/2019 | Pervan .................. B44C 5/0476 |
| 10,828,881 | B2 * | 11/2020 | Bergelin ................ B32B 13/14 |
| 2005/0208258 | A1 | 9/2005 | Hosokawa |
| 2005/0286397 | A1 | 12/2005 | Inagaki |
| 2007/0033891 | A1 * | 2/2007 | Imbabi .................. B01D 39/00 |
| | | | 52/387 |
| 2008/0149137 | A1 | 6/2008 | Steinbrenner |
| 2008/0318004 | A1 | 12/2008 | Ruhe |
| 2009/0011279 | A1 | 1/2009 | Wisenbaker, Jr. et al. |
| 2009/0017320 | A1 * | 1/2009 | Donelson .............. B32B 37/185 |
| | | | 428/482 |
| 2009/0155612 | A1 * | 6/2009 | Pervan .................... E04F 15/02 |
| | | | 428/498 |
| 2009/0235607 | A1 | 9/2009 | Chen |
| 2009/0308001 | A1 | 12/2009 | Wu |
| 2010/0115974 | A1 | 5/2010 | Okaza |
| 2011/0067336 | A1 | 3/2011 | McDonald |
| 2013/0295346 | A1 | 11/2013 | Ferguson |
| 2014/0087156 | A1 | 3/2014 | Sarkis |
| 2014/0134402 | A1 | 5/2014 | Pallon |
| 2014/0272302 | A1 | 9/2014 | Ciuperca |
| 2015/0059621 | A1 | 3/2015 | Hauber |
| 2016/0288447 | A1 * | 10/2016 | Cordeiro ................. B32B 9/025 |
| 2017/0204616 | A1 | 7/2017 | Scholz |
| 2017/0217133 | A1 | 8/2017 | Jordan et al. |
| 2018/0147873 | A1 * | 5/2018 | De Mondt ............. B32B 27/08 |
| 2018/0258651 | A1 * | 9/2018 | Meersseman ........... B32B 27/30 |
| 2018/0283014 | A1 | 10/2018 | Hodgkins et al. |
| 2019/0308914 | A1 | 10/2019 | Kong |
| 2020/0039190 | A1 * | 2/2020 | Lenaerts .................. B32B 27/12 |

FOREIGN PATENT DOCUMENTS

| | | |
|---|---|---|
| DE | 102012000468 | 7/2013 |
| EP | 2060389 | 5/2009 |
| EP | 2690142 A1 | 1/2014 |
| EP | 3536874 | 9/2019 |
| JP | H0828015 | 1/1996 |
| KR | 20140066086 | 5/2014 |
| SE | 19503648 | 3/2019 |
| WO | 2012061300 | 5/2012 |
| WO | 2014007738 | 1/2014 |
| WO | 2018234561 A1 | 12/2018 |
| WO | 2019064113 A1 | 4/2019 |
| WO | 2020114645 | 6/2020 |
| WO | 2020197475 | 10/2020 |

OTHER PUBLICATIONS

International Search Report and Written Opinion of corresponding PCT Application No. NL2025684, dated Mar. 3, 2021.
International Search Report and Written Opinion of Corresponding App. No. NL2024807 dated Sep. 18, 2020.

* cited by examiner

FLOOR PANEL AND METHOD OF MANUFACTURING A FLOOR PANEL

BACKGROUND

1. Technical Field

The invention relates to a panel suitable for constructing a floor or wall covering. The invention also relates to the use of such panel. The invention further relates to a method of manufacturing a panel suitable for constructing a floor or wall covering.

2. Description of the Related Art

The flooring industry uses mainly traditional materials for manufacturing (laminated) floor tiles. Examples of commonly used materials are high density fiberboard (HDF) which can be merged together by a formaldehyde or phenol-based resin, heterogeneous or homogeneous polyvinyl chloride (PVC) which may possibly comprise any plasticizers, pieces of solid hardwood, or layers of veneers glued together, and fired and glazed clay such as ceramic and porcelain tiles. The purpose of use of these materials depends mainly on their material properties such as impact resistance, rigidity, acoustic performance and/or appearance.

An interest in the use of alternative materials has occurred relatively recently, mostly due to a demand from the market for greener or more sustainable products. A prime example thereof is the use of mineral materials, since mineral materials are usually abundant resources, generally benefit a relatively high compressive strength and dimensional stability and a resistance to heat and fire. As such, they have certain clear advantages over plastic and HDF-based flooring panels.

Mineral based floorings generally utilize two major materials: calcium or magnesium. These materials are processed and form the basis of hydraulic cement and non-hydraulic cement respectively. The cement is generally cured into the shape of a board and used as a core or carrier plate and laminated together with a decorative layer. Calcium-based or hydraulic cement panels feature a core board made of a cement based on calcium carbonate or silicate. The high alkalinity of these hydraulic calcium-based cements does not allow for the addition of reinforcing materials such as fiberglass. This has greatly restricted their popularity in the flooring industry, as they are too fragile to withstand the stresses that high foot traffic places on their locking mechanism. Magnesium-based panels have a core board comprising a non-hydraulic cement based on magnesium oxychloride or oxysulfate. This cement features excellent strength and fire-retardant properties so it is widely employed in the building materials industry to produce a fire-retardant alternative to gypsum or particle board wall panels. Recent improvements in magnesium cement technology, such as a higher density, and specific constructions of fiber meshes incorporated in the boards, allow for their use in flooring panels. Still, generally these magnesium-based boards are light-weight, around 1300 to 1500 kg/m3, and brittle. Like calcium-based hydraulic cements, they lack the flexibility required to be installed as a floor, even more so to be equipped with a locking mechanism on the side of the boards for floating installation. This would require a flexibility that is commonly accepted as being inherently impossible for this type of material.

Hence, it is a goal of the invention to provide a mineral-based panel having an improved flexibility, to allow for use as a floor; and allow for the milling of a locking mechanism at the side edges of the floor panel.

BRIEF SUMMARY

The invention provides thereto a panel suitable for constructing a floor or wall covering, comprising a core comprising a mineral material, and comprising at least one pair of opposite side edges which are provided with interconnecting coupling means for interconnecting adjacent panels, wherein the core further comprises at least one dendritic additive.

The addition of this at least one dendritic additive to the mineral based core may improve the flexibility and/or tensile strength of the core. The yield strength of the core, and thus the panel's carrying strength may be improved due to the use of a dendritic additive. This improves the ability of the mineral material for being used in flooring purposes. Due to this improved flexibility and/or tensile strength it is also enabled that interconnecting coupling means can be applied in practice for a (floor) panel having a mineral based core. The improved flexibility and/or tensile strength prevents breakage of the protruding parts of the coupling means provided at the edges of the panel when tension is exerted onto said protruding parts. The improved flexibility and/or tensile strength can be explained by the dendritic additive inducing dendritic crystal growth within the mineral based core; while at the same time breaking up and centering the crystal structure. This may cause that in at least part of the core a web structure of crystals is obtained. At least one dendritic additive can for example be present in the form of three dimensionally expanded flexible crystallization matrix. Hence, the dendritic additive serves as frame for crystallization within the mineral material. The dendritic crystal structure in the mineral based changes the overall material properties of the final product, i.e. the (floor) panel as such. However, the addition of at least one dendritic additive does not negatively affect the dimensional stability and heat resistance of the panel.

The panel according to the present invention is in particular suitable for use in flooring, wall or ceiling coverings featuring a locking mechanism. The panel comprising at least one pair of opposite side edges which are provided with interconnecting coupling means for interconnecting adjacent panels. Preferably the panel according to the invention comprises two pairs of opposite side edges which are provided with interconnecting coupling means. As such a 'floating' covering can be assembled by interconnecting the individual panels with each other at all four sides, without the need for adhesives. It is further conceivable that the interconnecting coupling means comprise a tongue and a groove wherein the tongue is provided on one side edge of one pair of opposite side edges, and the groove is provided on the other side edge of the same pair of opposite side edges. Such a design of coupling means is well-known in the art and has proven highly suitable for panels for floor coverings such as a floating floor. In a further embodiment it is possible that the interconnecting coupling means have an interlocking feature which avoids free movement (play) of interconnected panels. Such an interlocking feature may be a projection and a respective recess provided on the respective opposite side edges by which neighboring panels interlock with each other.

DETAILED DESCRIPTION

Figure 1:
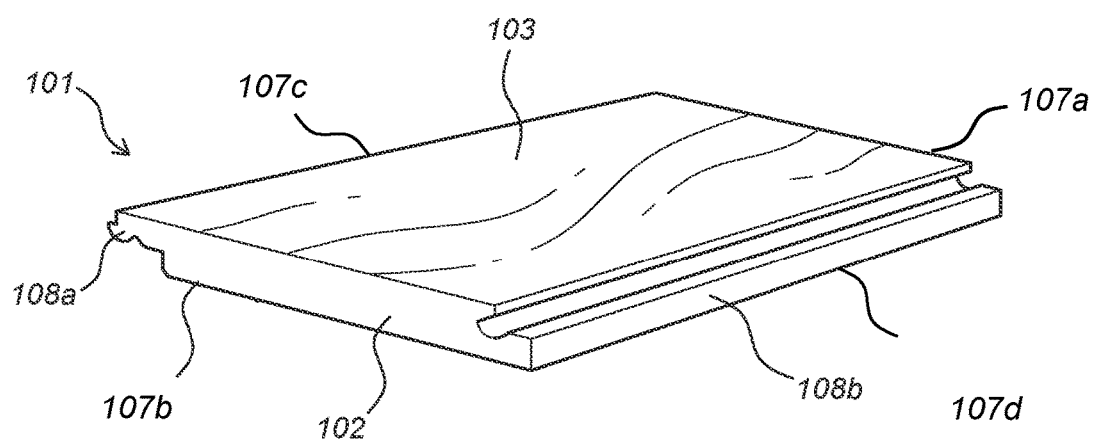
FIG. 1 is a perspective view of an exemplary panel.

The panel according to the present invention may comprise at least one top layer affixed to said core. The top layer may for example be a decorative layer. It is also conceivable that the top layer comprises a decorative layer and a wear layer covering said decorative layer. The decorative layer may be composed of a film provided and/or printed with a motif. The decorative layer may be a paper layer and/or a polymer layer, such as a PVC layer. The wear layer is commonly substantially transparent. The wear layer may consist of one or more transparent lacquer layers. Typically, the thickness of the layer(s) in the panel is in the range of 0.2 to 2.0 mm. The panel according to the present invention is typically a laminated panel. A decorative top layer, if applied, may for example comprise at least one ply of cellulose-based layer and a cured resin, wherein the cellulose-based layer is preferably paper or kraft paper. Said ply of cellulose-based material may also be a veneer layer adhered to a top surface of the core layer. The veneer layer is preferably selected from the group consisting of wood veneer, cork veneer, bamboo veneer, and the like. Other decorative top layers that could possibly be applied for the present invention include a ceramic tile, a porcelain tile, a real stone veneer, a rubber veneer, a decorative plastic or vinyl, linoleum, and decorative thermoplastic film or foil. The top layer may possibly be further provided with a wear layer and optionally a coating. Examples of thermoplastics which could be used in such top layer are PP, PET, PVC and the like. It is also possible to provide on the top facing surface of the core an optional primer and print the desired visual effect in a direct printing process. The decorative top layer can receive a further finishing with a thermosetting varnish or lacquer such as polyurethane, PUR, or a melamine based resin.

It is also conceivable that the panel comprises at least one backing layer affixed to the core. It is also conceivable that the panel comprises (at its back surface) at least one balancing layer, generally composed of at least one layer comprising lignocellulose and a cured resin. The panel may also comprise at least one acoustic layer, usually composed of a low density foamed layer of ethylene-vinyl acetate (EVA), irradiation-crosslinked polyethylene (IXPE), expanded polypropylene (XPP), expanded polystyrene (XPS), but also nonwoven fibers such as made from natural fibers like hemp or cork, or recycled/recyclable material such as PET or rubber. The density of this acoustic layer preferably has a density between 65 kg/m3 and 300 kg/m3, most preferably between 80 kg/m3 and 150 kgm3.

The dendritic additive can for example be a dendritic polymer. Such dendritic polymer can possibly have a monodisperse framework or a polydisperse framework. Non-limiting examples of possible dendritic polymers are dendrimers, dendrons, star polymer, hyperbranched polymer, dendrigrafts or linear-dendritic polymers. The dendritic polymer is preferably non-linear. The dendritic additive can for example be a dendritic polyurethane. Further non-limiting examples of dendritic polymers are polylactic acid, polypropylene and/or polysiloxane. Per definition, one-dimensional and/or polymers with a straight chain do not fall within the scope of a dendritic additive according to the present invention.

Preferably, the core comprises in the range of 0.1 to 10 wt % dendritic additive, preferably in the range of 0.5 to 5 wt %, and more preferably in the range of 1 to 2 wt %. It is for example possible that the amount of dendritic additive is in the range of 0.7 to 2 wt % of the total weight of mineral material. It is experimentally shown that said ranges provide the most promising results with respect to the desired material properties for the goal of the invention.

It is conceivable that the core is a multilayer core. Hence, the core may comprise at least one upper core layer and at least one lower core layer, wherein at least one core layer comprises at least one dendritic additive. Preferably all core layers comprise at least one dendritic additive. It is possible that different core layers have a different density. It is conceivable that the core comprises at least one reinforcing layer. In a possible embodiment, the core comprises multiple core layers wherein two adjacent core layers enclose a reinforcing layer. The presence of at least one reinforcing layer may further enhance the impact resistance of the core, and thus the panel. At least one reinforcing layer may for example be present in the form of a reinforcing mat, a membrane and/or a mesh. At least one reinforcing layer may for example comprise fiber glass, polypropylene, jute, cotton and/or polyethylene terephthalate.

At least part of the dendritic additive may possible be a nanodendritic additive. The use of nanodendritic additive may positively affect the crystallization of the mineral material within the core. It is also conceivable that at least part of the dendritic additive has an average particle size in the range of 5 to 250 micrometer, preferably in the range of 50 to 100 micrometer. The surface area of the dendritic additive is for example in the range of 5 $m^2$/g to 50 $m^2$/g.

FIG. 1 shows a perspective view of a possible embodiment of a flooring panel (101) according to the present invention. The panel (101) includes a core (102) including a mineral material. The core (102) includes two pairs of opposite side edges (107a, 107b, 107c, 107d) and a top side (103). A first pair of opposite side edges (107c, 107d) is provided with interconnecting coupling means (108a, 108b) for interconnecting adjacent panels (101). The interconnecting coupling parts (108a, 108b) are shown as an illustration, any type of conventional coupling parts could be applied. The core layer (102) includes at least one dendritic additive.

Figure 2:
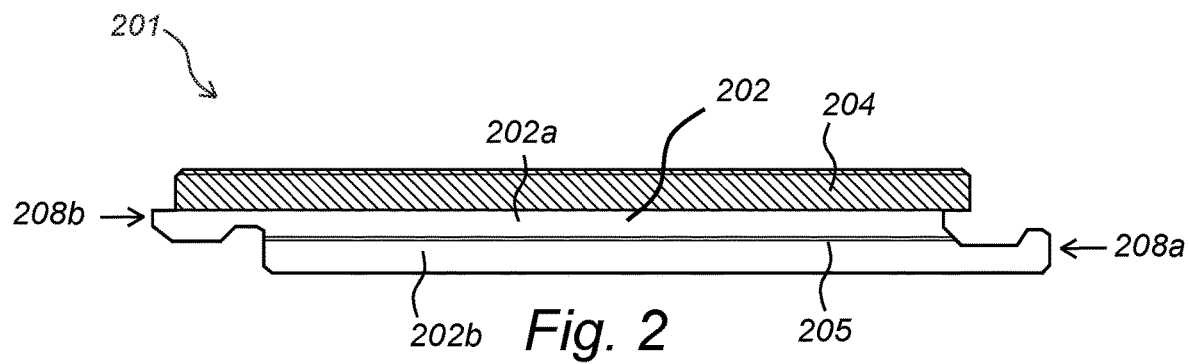
FIG. 2 is a side view of an exemplary panel.

FIG. 2 shows a cross section of a further embodiment of a flooring panel (201) according to the present invention. The panel (201) includes a core (202) which includes a mineral material and at least one dendritic additive. The panel (201) includes interconnecting coupling means (208a, 208b) for interconnecting adjacent panels (201). The panel (201) further includes a top layer (204) affixed to the core (201). The core (202) is a multilayer core which includes an upper core layer (202a) and a lower core layer (202b). The two adjacent core layers (202a, 202b) enclose a reinforcing layer (205).

The invention also relates to the use of a panel and to the use of a panel comprising dendritic particles in core of a mineral based floor panel.

The invention further relates to a method of manufacturing a panel suitable for constructing a floor or wall covering, in particular a panel according to the present invention, wherein the core is made by adding least one dendritic additive to a mineral material.

The mineral material comprising the core may for example be a magnesium oxide or magnesia (MgO). The magnesia can be calcined in order to affect the reactivity of the material. With respect to the present invention, the magnesia is typically obtained via a calcination process which is applied at temperatures of about 600 to 1300 degrees Celsius, preferably between 800 and 1000 degrees Celsius, such that reactive magnesia, which has a relatively high reactivity, is obtained. Reactive magnesia is also known in the field as "caustic-calcined magnesia" or light-burned magnesia. Typically, this is a highly reactive calcined MgO with a relatively small crystallite size. The magnesium cement, which can be used as primary core material, can be produced by mixing this reactive magnesia with an aqueous magnesium salt solution (usually including MgSO4, MgCl2 and/or MgCO3), then mixing this slurry with additives and water. Subsequently, the slurry is cured in order to form a ceramic material. This ceramic cement is poured onto a mold, and allowed to set, typically at either ambient or elevated temperature until it has cured. Non-limiting examples of these cements which can be used are magnesium chloride (MOC), magnesium oxysulfate (MOS) or magnesium carbonate. The magnesium chloride cement can be present in the 5-1-8 phase (5Mg(OH)2.MgCl2.8H2O) or the 3-1-8 phase (3Mg(OH)2.MgCl2.8H2O). Both of these phases form needle- or whisker-like crystals which benefit from useable properties, such as a dense microstructure and high bending strength. Magnesium oxysulfate cement can be present in the 5-1-3 phase (5Mg(OH)2.MgSO4.3H2O) or the 3-1-8 phase (3Mg(OH)2.MgSO4.8H2O). The former shows a needle- or whisker-like structure of typically 0.2 to 1.0 micrometer in diameter and a length of 20 to 50 micrometer; whereas the latter shows a flaky crystal structure.

At least one dendritic additive is preferably added to the abovementioned slurry during mixing prior to curing. The dendritic additive can achieve that a three-dimensionally expanded flexible crystallization matrix will be formed that serves as a frame for the crystallization of the magnesia. This three-dimensionally expandable dendritic additive typically consists of a material that features a resemblance to or have dendrites, including linear or non-linear branched polymers, star polymers, dendrimers that can provide an interwoven skeleton to the setting magnesia cement crystals. When the term dendrimer is used, repetitively branched molecules can be meant. Typically not included are any linear, one-dimensional and/or straight-chained polymers such as polyethylene, nylon, polyester, PVC, PAN, alkanes or similar.

It is also conceivable that instead of a magnesium based core any other crystal based cement is used in relation to the present invention.

The method may further comprise a step wherein least one pair of opposite side edges of the panel is provided with interconnecting coupling means for interconnecting adjacent panels. This can be any conventional coupling means, such as aforementioned non-limiting examples.

The invention also relates to a method of manufacturing a panel suitable for constructing a floor or wall covering, according to the present invention, wherein at least one dendritic additive is added to the core.

What is claimed is:

1. A panel for constructing a floor or wall covering comprising:
 a core comprising a mineral material and comprising at least one pair of opposite side edges wherein the opposite side edges are provided with interconnecting coupling means for interconnecting adjacent panels,
 wherein the core further comprises at least one dendritic additive within the core wherein the mineral material comprises magnesium oxide, magnesium oxysulfate or magnesium oxychloride or wherein the mineral material comprises magnesium oxide, magnesium oxysulfate and magnesium oxychloride.

2. The panel according to claim 1, comprising at least one top layer affixed to said core.

3. The panel according to claim 2, wherein the dendritic additive is a dendritic polymer.

4. The panel according to claim 3, wherein the dendritic polymer is non-linear.

5. The panel according to claim 4, wherein the core comprises 0.1 to 10 wt % dendritic additive.

6. The panel according to claim 5, wherein the core is a multilayer core.

7. The panel according to claim 6, wherein the core comprises at least one upper core layer and at least one lower core layer, wherein at least one core layer comprises at least one dendritic additive.

8. The panel according to claim 7, wherein the core comprises at least one reinforcing layer.

9. The panel according to claim 8, wherein the reinforcing layer comprises fiber glass, polypropylene, jute, cotton and/or polyethylene terephthalate or wherein the reinforcing layer comprises fiber glass, polypropylene, jute, cotton and polyethylene terephthalate.

10. The panel according to claim 9, wherein the dendritic additive is a nanodendritic additive.

11. The panel according to claim 10, wherein at least part of the dendritic additive has an average particle size in the range of 5 to 250 micrometers.

12. A method of manufacturing a panel for constructing a floor or wall covering according to claim 1, comprising adding at least one dendritic additive to the core.

13. The method according to claim 12, wherein at least one pair of opposite side edges of the panel is provided with interconnecting coupling means for interconnecting adjacent panels and wherein at least part of the dendritic additive has an average particle size in the range of 5 to 250 micrometers.

14. The panel according to claim 1, wherein at least part of the dendritic additive has an average particle size in the range of 50 to 100 micrometers.

* * * * *